United States Patent
Bennett et al.

(10) Patent No.: US 7,558,923 B1
(45) Date of Patent: Jul. 7, 2009

(54) PREVENTION OF LIVE-LOCK IN A MULTI-PROCESSOR SYSTEM

(75) Inventors: Brian R. Bennett, Laguna Niguel, CA (US); Stephen S. Chang, Glendora, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/470,329

(22) Filed: Dec. 22, 1999

(51) Int. Cl.
G06F 12/08 (2006.01)
G06F 13/18 (2006.01)
G06F 5/00 (2006.01)

(52) U.S. Cl. ............ 711/144; 711/151; 711/152; 711/158; 711/166; 710/200; 710/244; 710/52

(58) Field of Classification Search .......... 711/3, 711/118, 144–146, 150–151, 158, 165–166, 711/147, 152, 154, 210; 710/52, 54, 108, 710/305–306, 309–310, 200, 111, 114–116, 710/121–123, 244
See application file for complete search history.

(56) References Cited

U.S. PATENT DOCUMENTS

| 5,761,446 | A | * | 6/1998 | Donley et al. ............ 710/107 |
| 5,897,656 | A | | 4/1999 | Vogt et al. ............... 711/141 |
| 5,941,967 | A | * | 8/1999 | Zulian .................... 710/107 |
| 6,032,231 | A | * | 2/2000 | Gujral .................... 711/145 |
| 6,041,376 | A | * | 3/2000 | Gilbert et al. ............ 710/108 |
| 6,138,218 | A | * | 10/2000 | Arimilli et al. ........... 711/146 |
| 6,141,715 | A | * | 10/2000 | Porterfield ............... 710/113 |
| 6,502,150 | B1 | * | 12/2002 | Bogin et al. ............. 710/240 |

* cited by examiner

*Primary Examiner*—Denise Tran
(74) *Attorney, Agent, or Firm*—Schwegman, Lundberg & Woessner, P.A.

(57) ABSTRACT

Some embodiments of the invention include a method of preventing live-lock in a multiprocessor system. The method comprising identifying a first bus transaction attempting to modify a resource and setting a status bit to indicate that a bus transaction attempting to modify the shared resource is pending. The method further comprising retrying each subsequent nonmodifying bus transaction for the shared resource until the status bit is cleared.

18 Claims, 5 Drawing Sheets

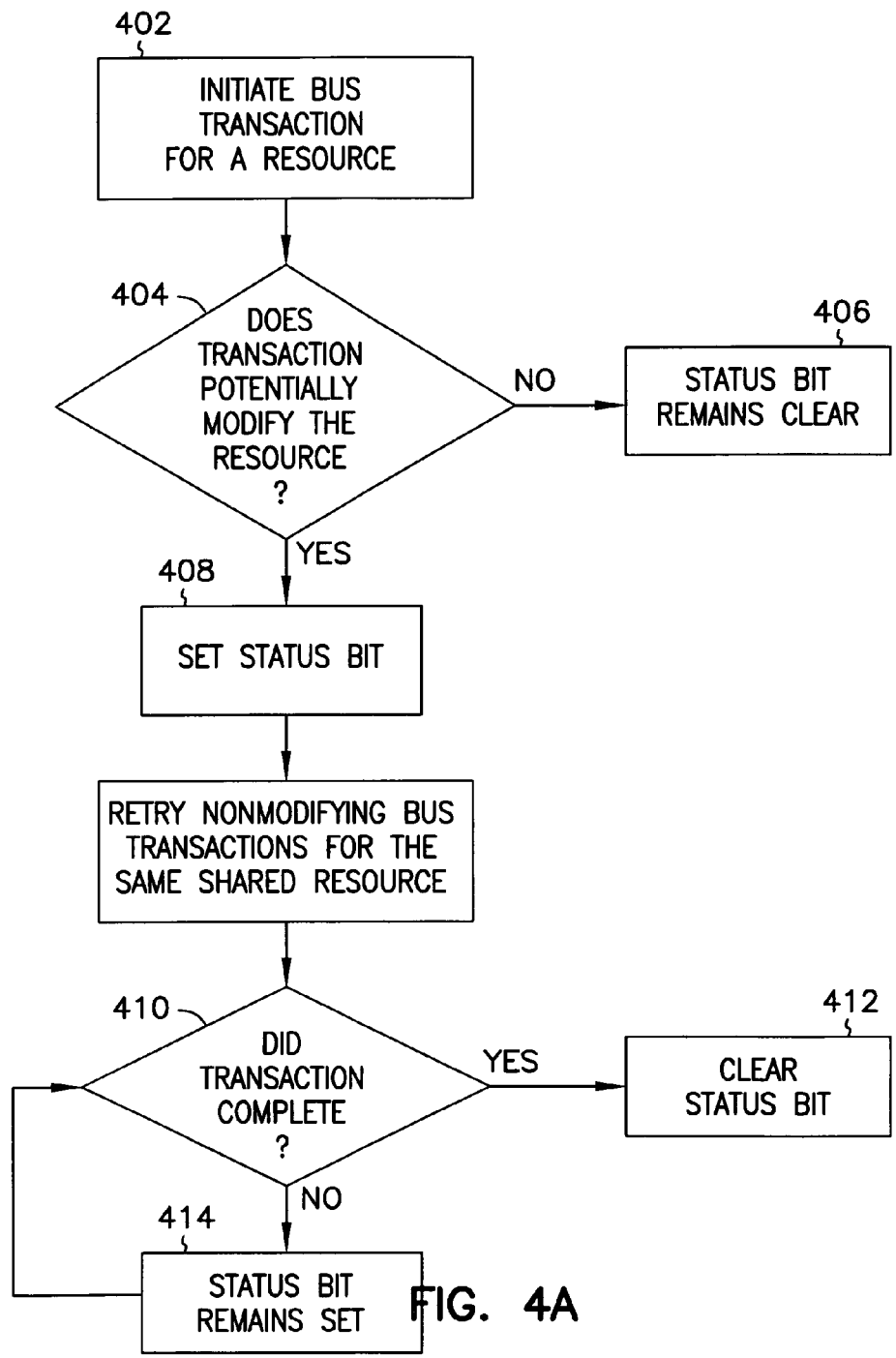

PREVENTION OF LIVE-LOCK IN A MULTI-PROCESSOR SYSTEM

FIELD OF THE INVENTION

The present invention is related to multiprocessor computer systems, and more particularly to preventing live-lock in a multiprocessor computer system.

BACKGROUND INFORMATION

A computer system can be broken into three basic blocks: a central processing unit (CPU), memory, and input/output (I/O) units. These blocks are interconnected by means of a bus. An input device such as a keyboard, mouse, disk drive, etc., is used to input instructions and data to the computer system via the I/O unit. These instructions and data can be stored in memory. The CPU retrieves the data stored in the memory and processes the data as directed by the stored instructions. The results can be stored back into memory or outputted via the I/O unit to an output device such as a printer, cathode-ray tube (CRT) display, liquid crystal display (LCD), etc.

In some computer systems multiple processors are utilized. This use of multiple processors allows various tasks or functions to be handled by other than a single CPU so that the computing power of the overall system is enhanced. In some currently available systems, up to four processors are connected with a single shared bus. In such multiprocessor systems, two or more processors may request a shared resource (for example, the same cache line) at the same time. Current multiprocessor systems with a single shared bus commonly resolve contention between processors for the same resource by the "order of operations." In other words, the processors are granted the shared resource in the order that the bus transaction requests occur.

However, certain architectures do not permit multiple bus transactions to be outstanding for a single shared resource. In these architectures, the processor that initiated the transaction "first" is allowed to complete the transaction. All subsequent transactions are retried if the transactions are for the same resource and the transactions occur before the first transaction has completed. A transaction may be retried any number of times until the transaction is allowed to complete. However, a problem arises when one processor is "locked out" because it is always being retried.

For example, such a problem can occur when multiple processors initiate bus transactions for the same resource at about the same time and the first processor that is granted the resource is only reading the resource. In this case, a live-lock situation can occur if a subsequent bus transaction for the same resource is to modify the resource and that subsequent bus transaction is continually retried. Even though the subsequent bus transaction to modify the resource is retried, the other processors still snoop the subsequent bus transaction. The first processor's cache memory contains a copy of the resource as a result of the read operation. However, the first processor's copy of the resource is then invalidated when the first processor snoops the subsequent bus transaction to modify the resource. This causes the first processor to issue another bus transaction to acquire a valid copy of the same resource. Live-lock occurs when the first processor that is just reading the resource is always being granted the resource and a second processor that is trying to modify the resource is continually being retried.

Such a live-lock situation can cause a temporary stall and lack of forward progress in a program. The possibility of a processor stalling increases as more processors are added to a system. Clearly, from a performance standpoint, this is a highly undesirable situation.

Thus, there is a need for a mechanism to prevent live-lock in a multiprocessor system.

SUMMARY OF THE INVENTION

Some embodiments of the invention include a method of preventing live-lock in a multiprocessor system. The method comprising identifying a first bus transaction that attempts to modify a shared resource and setting a status bit to indicate that a bus transaction attempting to modify the shared resource is pending. The method further comprising retrying each subsequent nonmodifying bus transaction for the shared resource until the status bit is cleared.

Still other embodiments, aspects and advantages of the invention will become apparent by reference to the drawings and by reading the following detailed description.

BRIEF DESCRIPTION OF THE DRAWINGS

FIGS. 4A and 4B are a flow charts of example embodiments of methods of preventing live-lock in a multiprocessor system.

DESCRIPTION OF THE PREFERRED EMBODIMENTS

An apparatus for and method of preventing live-lock in a multiprocessor system are described in detail below. In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
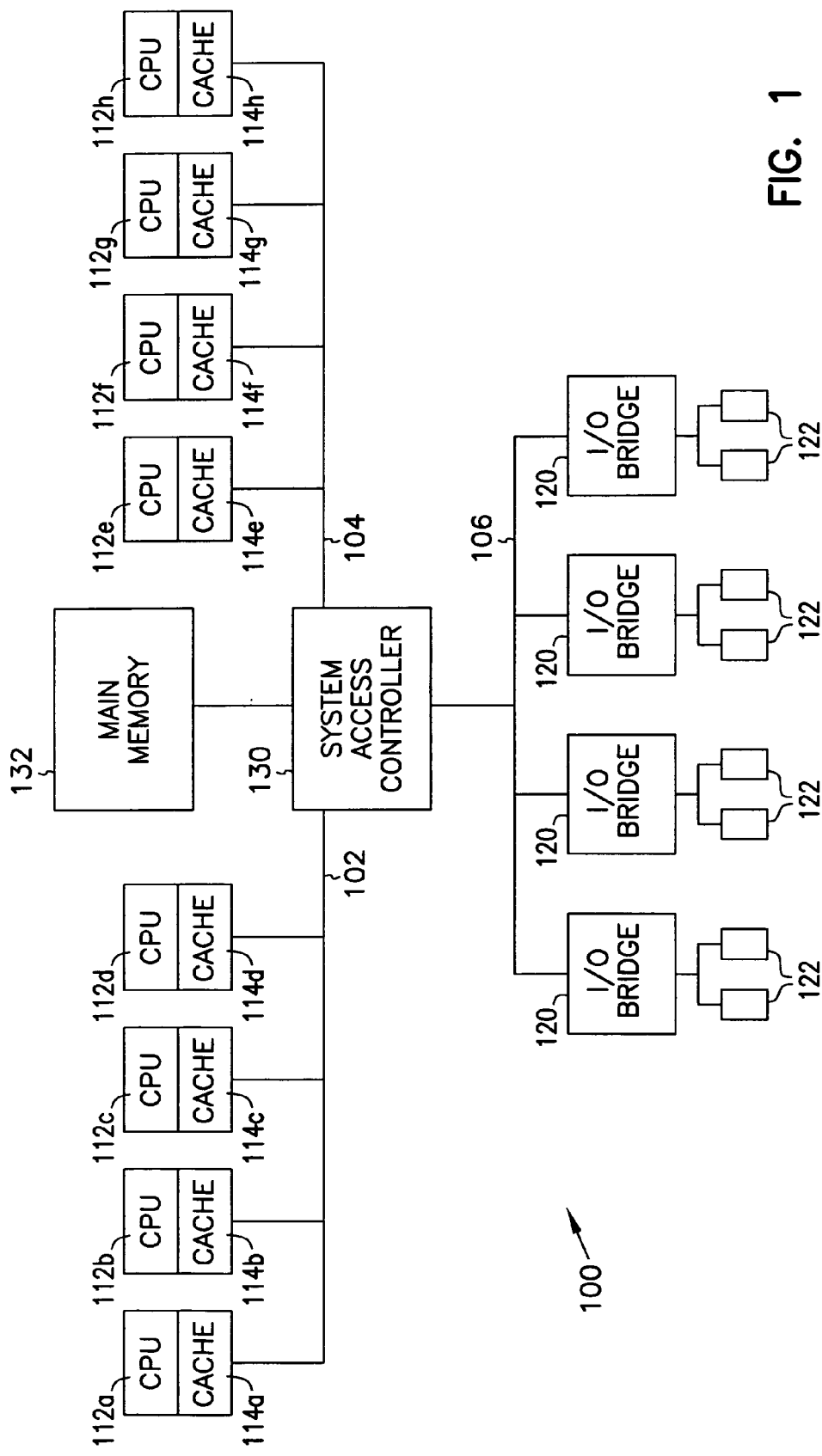
FIG. 1 is a block diagram of an example embodiment of a multiprocessor computer system upon which the present invention may be practiced.

As illustrated in FIG. 1, the one embodiment of a multiple-bus system 100 contains three system buses: a first system bus 102, a second system bus 104 and a third system bus 106. In this detailed description, the first system bus 102 is also referred to as the left bus 102, the second system bus 104 is referred to as the right bus 104 and the third system bus 106 is referred to as the I/O bus 106. In an example embodiment, each system bus 102, 104 and 106 is a Pentium Pro system bus which is defined by Intel Corporation. The Pentium Pro system bus provides 36 bits of address, 64 bits of data and a variety of control and error correction signals. However, embodiments of the present invention are not limited to a Pentium Pro system bus. Embodiments of the present invention are adaptable to a wide range of system buses.

A first plurality of processors 112a, 112b, 112c, 112d etc. are connected to the left bus, and a second plurality of processors 112e, 112f, 112g, 112h, etc. are connected to the right bus 104. The processors 112a, 112b, 112c, 112d, 112e, 112f, 112g, 112h, etc., are collectively referred to as the processors 112. While eight processors 112 are illustrated, each bus 102 and 104 can be connected to additional processors 112. In one embodiment each processor 112 has an internal cache unit 114. The cache memories 114 in the processors 112 improve processing performance by storing data locally. The cache memories 114 organize the data values into cache lines. The size of a cache line varies from one multiple bus system to another multiple bus system. In one embodiment, a cache line contains 32 eight-bit data values (256 bits).

The third system bus 106 in one embodiment transmits input/output (I/O) transactions between a plurality of I/O bridges 120 and the main memory 132, and is thus called the I/O bus 106. In one embodiment, the I/O bridge 120 transfers I/O transactions from the I/O bus 106 to a plurality of I/O devices 122 using a PCI bus. However, the I/O bridges 120 are not limited to PCI buses and may be implemented with a wide range of devices which provide accesses to a variety of I/O devices 122. In addition, the I/O bridge 120 is optional and compatible I/O devices 122 may be directly attached to the I/O bus 106.

The multiple-bus system 100 also includes a shared main memory. In one embodiment, the shared main memory 132 comprises synchronous dynamic random access memory (SDRAM). In operation, the processors 112 fill their cache memories 114 by reading data from the main memory 132. In order to maintain up-to-date data in the cache memories 114, the cache memories 114 within the processors 112 on a particular bus, snoop the main memory bus transactions which occur on their assigned bus 102, 104 or 106. When a cache memory 114 contains the same cache line as the cache line identified in a bus transaction, a snoop hit occurs. However, a live-lock problem can occur when a first processor, such as processor 112a, that is just reading the cache line is always being granted the cache line and a second processor, such as processor 112b, that is trying to modify the resource at about the same time is continually being retried.

The multiple-bus system also includes a novel system access controller 130 which is capable of preventing such live-lock problems. Generally speaking, the system access controller 130 controls the operation of the multiple-bus system. An example embodiment of a system access controller for controlling the operation of a multiple-bus system is described in U.S. Pat. No. 5,897,656 entitled "System and Method for Maintaining Memory Coherency in a Computer System Having Multiple System Buses." The novel system access controller 130, according to one embodiment of the present invention, includes a live-lock prevention mechanism. Such a system access controller 130 is described in more detail by reference to FIG. 2.

Figure 2:
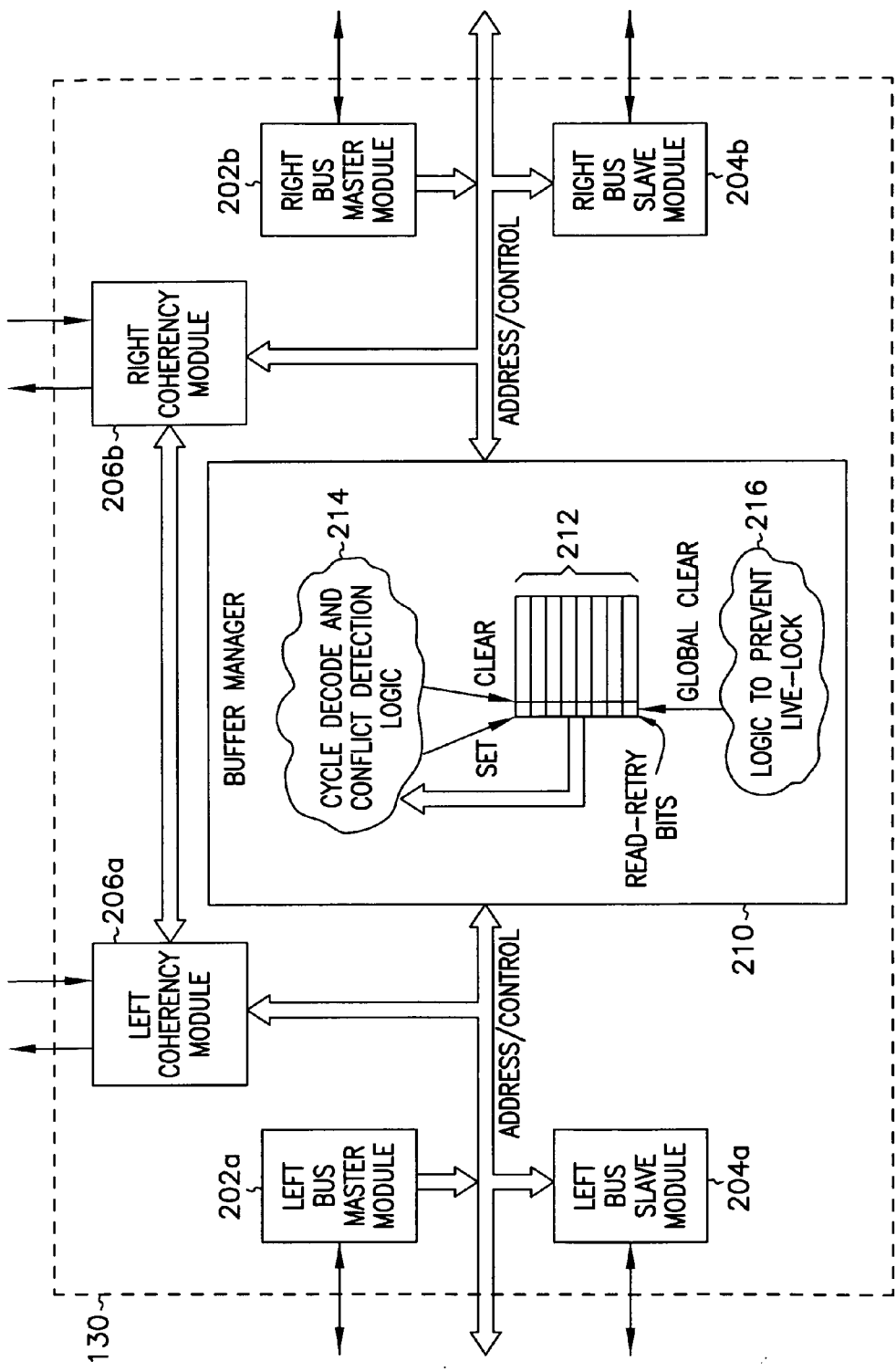
FIG. 2 is a more detailed block diagram of an example embodiment of the system access controller shown in FIG. 1.

Focusing now on the novel system access controller 130, as illustrated in FIG. 2, one embodiment of the system access controller 130 is implemented as an Application-Specific Integrated Circuit (ASIC). In general, the system access controller 130 controls buses, such as the three buses 102, 104 and 106 of FIG. 1, and the main memory 132. A system access controller according to an example embodiment of the present invention also prevents live-lock in the multiple-bus system 100. In one embodiment, the system access controller 130 comprises a buffer manager as well as bus interface units 202a, 202b, 204a, 204b and coherency modules 206a, 206b.

The system access controller 130 contains a left bus master 202a, a right bus master 202b and (collectively referred to herein as the bus masters 202 herein). In some embodiments, the system access controller 130 also contains an I/O bus master (not shown in FIG. 2). The bus masters 202 control a bus transaction on their assigned buses. For example, the left bus master 202a initiates bus transactions on the left bus 102 of FIG. 1. After the bus master 202 performs one or more bus transactions, the bus master 202 relinquishes the bus so that another device can become the bus master. The control logic for implementing the bus masters 202 is well known in the art.

In addition, the system access controller 130 contains a left bus slave 204a, a right bus slave 204b (collectively referred to as the bus slaves 204). In some embodiments, the system access controller 130 also contains an I/O bus slave (not shown). The bus slaves 204 receive bus transactions initiated by one of the processors 112 or I/O bridges 120 on their assigned buses 102, 104 and 106 of FIG. 1. For example, one of the processors 112 on the right bus may initiate a read bus transaction for a particular data value in the main memory 132. The right bus slave 204 receives the bus transaction and obtains the requested data value from the main memory 132. The control logic for implementing the bus slaves 204 is well known in the art. A bus master 202 and a bus slave 204 for an assigned bus are collectively referred to herein as the bus interface unit.

In one embodiment, the system access controller 130 also contains a left coherency module 206a and a right coherency module 206b (collectively referred to as the coherency modules 206). The coherency modules 206 coordinate bus-to-bus communications in such a way as to maintain cache memory coherency with a small amount of cross-bus traffic. In one embodiment, the left coherency module 206a monitors the left bus and the right coherency module 206b monitors the right bus. For example, when a processor 112a on the left bus generates a read bus transaction which accesses a cache line in the main memory, the processor 112a places the desired cache line address on the left bus. The left coherency module 206a receives the desired cache line address and stores the cache line address along with coherency status associated with the cache line address. The coherency status associated with each cache line address relates to the status of the cache line in the cache memories. The coherency status can be implemented with a wide range of cache coherency protocols.

According to one embodiment of the invention, the system access controller 130 also contains a buffer manager 210. The buffer manager 210 contains cycle decode and conflict detection logic 214. The cycle decode portion of the logic 214 determines the type of bus transaction occurring on the cycle decoder's assigned bus. In one embodiment, the cycle decoder uses well known bus monitoring logic to monitor the bus control lines and determines the type of bus transaction. The conflict detection portion of the logic 214 determines if multiple bus transactions are contending for the same resource. In an example embodiment, the conflict detection portion of the logic comprises a plurality of address comparators that identify address conflicts. Typically, address conflicts arise when two different bus transactions relate to the same data value and occur at about the same time.

The buffer manager 210 also contains a pool of memory cells 212 (referred to herein as buffers). The buffer manager 210 has a plurality of buffers associated with the shared resources. The buffer manager 210 stores information associated with each bus transaction in one of the buffers 212. In one embodiment, the system access controller comprises a buffer manager having 64 cache line buffers.

In operation, each new transaction is assigned to a new buffer. When each transaction is complete, the buffer that the transaction was assigned to is returned to the pool of available buffers so that the buffer can be reused for new transactions. If a transaction is assigned a buffer and before that buffer is released into the pool of available buffers, a second transaction with the same address is initiated, the second transaction is assigned to the same buffer. The buffers 212 are described in more detail by reference to FIG. 3.

Figure 3:
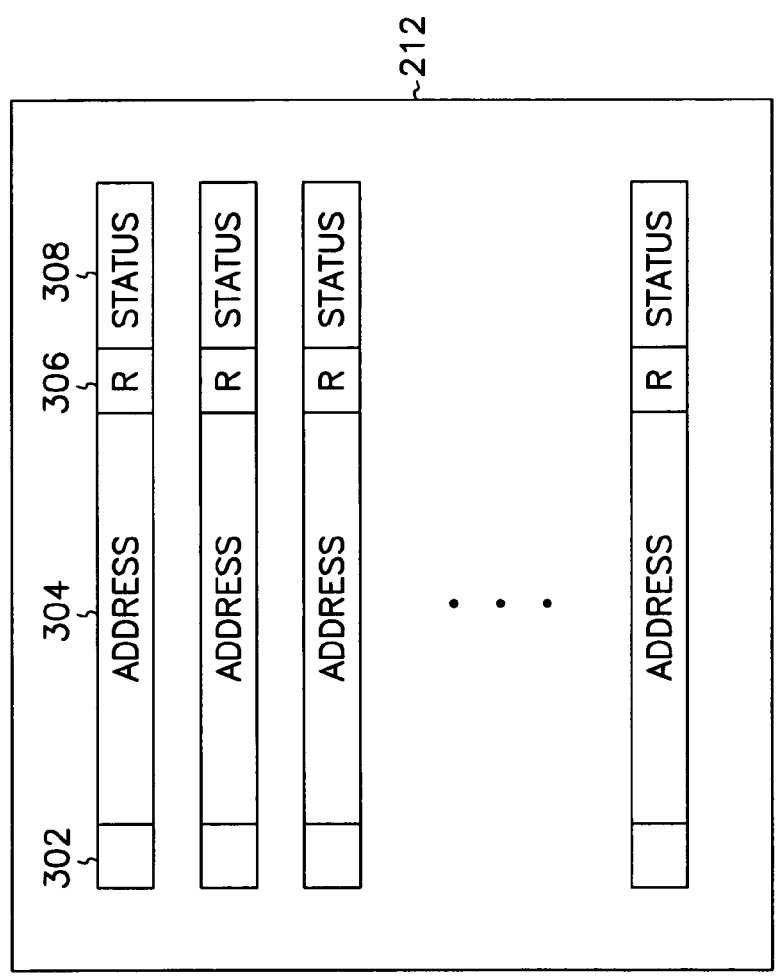
FIG. 3 is a more detailed block diagram of the buffers in the buffer manager shown in FIG. 2.

FIG. 3 is a more detailed block diagram of the buffers 212 in the buffer manager of FIG. 2. In one embodiment, each one of the buffers contains an "in-use" bit 302, a memory address 304, and a set of status bits 306, 308. The in-use bit 302 indicates whether a particular buffer is available for use. The memory address 304 is the address identified by a particular bus transaction. The set of status bits 306, 308 indicate a variety of conditions, including but not limited to, the type of bus transaction. In one embodiment, one of the status bits 306 indicates that a transaction has been initiated that could potentially modify the resource. This status bit 306 is referred to herein as a "read-retry bit." The read-retry bit is set when the transaction that could potentially modify the resource is initiated. If the transaction completes successfully, the read-retry bit is cleared. If the transaction does not complete, for example if the transaction is retried, the read-retry bit remains set for that particular transaction. When the read-retry bit is set for a transaction, any nonmodifying transactions that attempt to use the same resource will be retried. As a result, the next attempt to complete the transaction to modify the resource is given priority over all nonmodifying transactions for the resource. The read-retry status bit prevents a first processor that is just reading the resource from always being granted the resource while a second processor that is trying to modify the resource is continually being retried.

In an example embodiment with 64 buffers, there are 64 read-retry bits. Each one of the read-retry bits is associated with one of the buffers. However, embodiments of the present invention are not limited to 64 buffers and 64 read-retry bits. Alternate embodiments with a different number of buffers and corresponding read-retry bits are contemplated.

Referring back to FIG. 2, the buffer manager 210 also contains logic to prevent an unresolvable condition from occurring when a transaction attempting to modify a resource is retried but the transaction is never reissued by the processor. In this case, the logic 216 generates a random reset signal to clear all of the read-retry status bits. The random reset signal is generated at any interval of time that is greater than the length of time of a single transaction.

In operation, when one of the bus slaves 204 receives a bus transaction, the bus slave 204 forwards the address associated with the bus transaction to the cycle decode logic 214 assigned to the same bus as the bus slave 204. The cycle decode logic 214 compares the new memory address with all of the memory addresses existing in the in-use buffers 212. If the same memory address is detected in the in-use buffers 212, the cycle decode logic 214 produces an output which notifies the bus slaves 204 that an address conflict exists. The bus slave 204 then sends a retry signal to the processor 112 which initiated the bus transaction creating the address conflict. The processor 112 then initiates the bus transaction at a later date. If the bus transaction is a type that modifies a cache line, the read-retry bit is set. Then, until the transaction completes, the read-retry bit remains set in order to give priority to subsequent transactions attempting to modify the resource. As a result, the read-retry status bit prevents a first processor that is just reading the resource from always being granted the resource while a second processor that is trying to modify the resource is continually being retried.

FIG. 4A is a flow chart illustrating one embodiment of a method of preventing live-lock in a multiprocessor system. As shown in FIG. 4A, a bus transaction is initiated for a shared resource (block 402). In one embodiment, the shared resource is a cache line. The type of the bus transaction is used to determine if the bus transaction potentially modifies the shared resource (block 404). In one embodiment, any bus write or invalidate transaction potentially modifies the shared resource. If the bus transaction does not modify the shared resource, a status indicator (such as a read-retry status bit) remains clear (i.e. not set) (block 406). For example, a bus read transaction does not modify the shared resource and does not cause the status indicator for the transaction to be set.

If the bus transaction potentially modifies the shared resource, the status indicator is set (block 408). When the status indicator is set, any subsequent non-modifying bus transaction for the same shared resource is retried. Retrying each subsequent non-modifying bus transaction for the same shared resource ensures that the shared resource will be available when the bus transaction attempting to modify the resource is reissued and thus prevents live-lock.

In one embodiment, the status indicator remains set (block 414) for the bus transaction until the bus transaction completes (block 410). When the transaction completes, the status indicator is cleared (block 412).

Figure 4B:
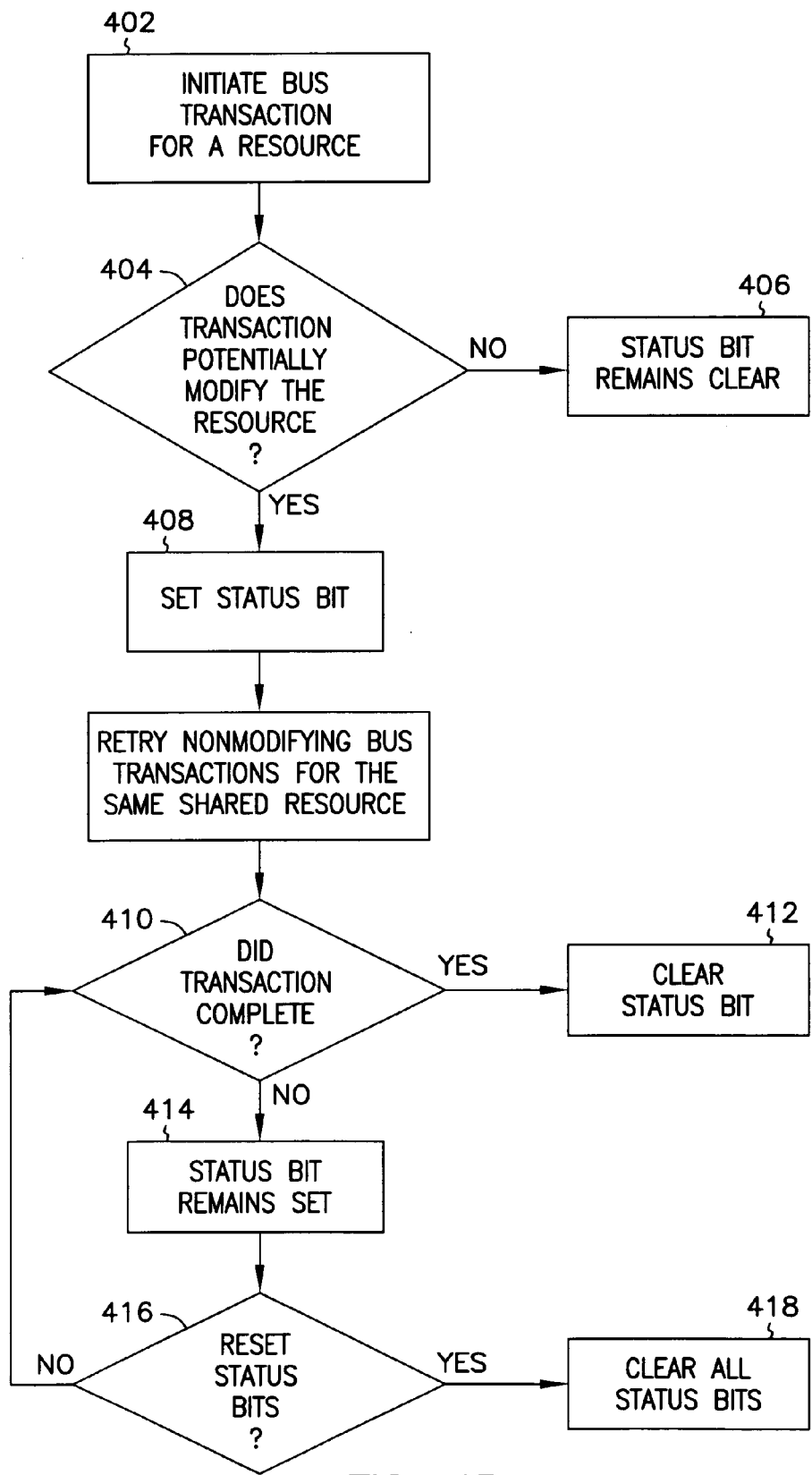

In an alternate embodiment, as shown in FIG. 4B, the status indicator remains set (block 414) for the bus transaction until the bus transaction completes (block 410) or until all of the status indicators are reset (block 416). Resetting all of the status indicators prevents an unresolvable condition from occurring when a transaction attempting to modify a resource is retried but never reissued. In such a case, the status indicator is set because the transaction attempts to modify a resource. However, because the transaction is never reissued, the transaction is never completed according to the method shown in FIG. 4A. As a result, the status indicator is never cleared and any read transactions for the resource will continually be retried. According to the example method shown in FIG. 4B, the reset function (block 416) clears the status indicator for one or all transactions (block 418). In one embodiment, the reset function occurs randomly. In another example embodiment, the reset function occurs at periodic intervals that are longer than a length of time needed for a bus transaction to complete. In still another example embodiment, the reset function uses a pseudo-random method of clearing the status bit or bits.

In the foregoing detailed description, computer systems for and methods of preventing live-lock in a multi-processor system have been described. This application is intended to cover any adaptations or variations of the present invention. For example, although the invention is described herein with reference to a two or three bus system, the invention could contain more busses. Furthermore, the invention could be implemented on a wide variety of multiprocessing systems. Therefore, it is intended that this invention be limited only by the claims and the equivalents thereof.

What is claimed is:

1. A method of preventing live-lock in a multiprocessor system, the method comprising:
    identifying a first bus transaction that is a nonmodifying transaction on a shared resource;
    identifying a second bus transaction that attempts to modify the shared resource, wherein the second bus transaction has priority over the first bus transaction to access the shared resource;
    setting a status bit to indicate that the second bus transaction attempting to modify the shared resource is pending;
    checking whether the second bus transaction completes;
    clearing the status bit if the second bus transaction completes;
    maintaining the status bit as being set if the second bus transaction does not complete;
    randomly resetting the status bit either as being set or as cleared; and retrying only the first bus transaction and each subsequent nonmodifying bus transaction for the shared resource until the status bit is cleared.

2. The method of claim 1 further comprising clearing the status bit when the second bus transaction completes.

3. The method of claim 1 further comprising clearing the status bit using a pseudo-random method.

4. A method of preventing live-lock in a multiprocessor system, the method comprising:
issuing a first bus transaction to read a cache line;
granting the cache line for the first bus transaction;
issuing a second bus transaction that attempts to modify the cache line, wherein the second bus transaction has priority over the first bus transaction to access the cache line;
setting a status bit to indicate that the second bus transaction attempting to modify the cache line is pending;
checking whether the second bus transaction completes;
clearing the status bit if the second bus transaction completes;
maintaining the status bit as being set if the second bus transaction does not complete;
randomly resetting the status bit either as being set or as cleared;
retrying only the first bus transaction and each subsequent read transaction if the status bit is set;
reissuing the second bus transaction that attempts to modify the cache line; and
granting the cache line for the reissued second bus transaction if the status bit is set for the cache line.

5. The method of claim 4 further comprising clearing the status bit when the reissued second bus transaction complete.

6. The method of claim 4 further comprising clearing the status bit pseudo-randomly.

7. A multiprocessor computer system comprising:
a plurality of processors;
a resource shared by the plurality of processors;
at least one system bus interconnecting the shared resource and the plurality of processors;
a plurality of buffers, each one of the plurality of buffers associated with a bus transaction initiated on the at least one system bus by one of the processors; and
a status indicator associated with each one of the plurality of buffers, the status indicator being set to indicate that only nonmodifying bus transactions are to be retried when a modifying bus transaction attempts to access the shared resource, wherein the modifying bus transaction has priority over the nonmodifying bus transactions to access the shared resource,
wherein the status indicator is a status bit to indicate whether the modifying bus transaction completes, if the modifying bus transaction completes, the status bit is cleared, otherwise status bit remains as being set, and the status bit is randomly reset.

8. The multiprocessor computer system of claim 7 wherein four processors are coupled to each one of the system buses.

9. The multiprocessor computer system of claim 7 wherein the at least one system bus comprises two processor buses.

10. The multiprocessor computer system of claim 7 having four processors coupled to each one of the two processor buses.

11. The multiprocessor computer system of claim 10 further comprising an input/output bus.

12. A multiple bus, multiprocessor computer system comprising:
a plurality of processors;
a plurality of data cache memories;
a system memory shared by the plurality of processors;
at least two buses interconnecting the system memory with the plurality of data cache memories and the plurality of processors; and
a controller comprising,
a plurality of buffers, each one of the plurality of buffers associated with a bus transaction initiated on one of the buses by one of the processors; and
a status indicator associated with each one of the plurality of buffers, the status indicator being set to indicate that only nonmodifying bus transactions are to be retried when a modifying bus transaction attempts to access the system memory, wherein the modifying bus transaction has priority over the nonmodifying bus transactions to access the system memory,
wherein the status indicator is a status bit to indicate whether the modifying bus transaction completes, if the modifying bus transaction completes, the status bit is cleared, otherwise status bit remains as being set, and the status bit is randomly reset.

13. The multiple bus, multiple processor system of claim 12 wherein each one of the at least two buses is coupled to four of the processors.

14. An integrated circuit comprising:
a bus interface to control a plurality of bus transactions;
a coherency module to maintain cache coherency for a plurality of cache lines; and
a buffer manager comprising,
a plurality of buffers, each one of the buffers to store information associated with one of the plurality of bus transactions received by the bus interface; and
a plurality of status indicators being set to indicate that only nonmodifying bus transactions are to be retried when a modifying bus transaction attempts to access one of the cache lines at least one of the status indicators associated with each one of the buffers, wherein the modifying bus transaction has priority over the nonmodifying bus transactions to access the cache lines,
wherein the each status indicator of the plurality of status indicators is a status bit to indicate whether the modifying bus transaction completes, if the modifying bus transaction completes, the status bit is cleared, otherwise status bit remains as being set, and the status bit is randomly reset.

15. The integrated circuit of claim 14 wherein the buffer manager further comprises logic to determine a type of bus transaction occurring on a bus.

16. The integrated circuit of claim 14 wherein the buffer manager further comprises logic to determine if two of the bus transactions are contending for a same cache line.

17. The integrated circuit of claim 14 further comprising logic to reset all of the plurality of status indicators.

18. The integrated circuit of claim 14 comprising 64 buffers and 64 status indicators.

* * * * *

UNITED STATES PATENT AND TRADEMARK OFFICE
CERTIFICATE OF CORRECTION

PATENT NO. : 7,558,923 B1
APPLICATION NO. : 09/470329
DATED : July 7, 2009
INVENTOR(S) : Brian R. Bennett et al.

Page 1 of 1

It is certified that error appears in the above-identified patent and that said Letters Patent is hereby corrected as shown below:

In column 8, line 46, in Claim 14, after "wherein" delete "the".

Signed and Sealed this

Twenty-ninth Day of December, 2009

David J. Kappos
*Director of the United States Patent and Trademark Office*